United States Patent [19]

Tanisawa

[11] Patent Number: 5,293,441
[45] Date of Patent: Mar. 8, 1994

[54] OPTICAL DEVICE CAPABLE OF RELIABLY FIXING A SUBSTRATE TO A PACKAGE

[75] Inventor: Yasuhisa Tanisawa, Tokyo, Japan
[73] Assignee: NEC Corporation, Tokyo, Japan
[21] Appl. No.: 995,705
[22] Filed: Dec. 23, 1992

[30] Foreign Application Priority Data

Dec. 25, 1991 [JP] Japan ............... 3-343025

[51] Int. Cl.⁵ ............................... G02B 6/42
[52] U.S. Cl. ............................... 385/92; 385/88
[58] Field of Search ............................ 385/88–94

[56] References Cited

U.S. PATENT DOCUMENTS

| | | | |
|---|---|---|---|
| 4,474,429 | 10/1984 | Yoldas et al. | 385/88 X |
| 4,548,466 | 10/1985 | Evans et al. | 385/90 |
| 4,615,031 | 9/1986 | Eales et al. | 385/94 X |
| 4,744,626 | 5/1988 | Mery | 385/90 |
| 5,128,956 | 7/1992 | Aoki et al. | 372/703 |
| 5,222,170 | 6/1993 | Bargar et al. | 385/88 |

*Primary Examiner*—John D. Lee
*Attorney, Agent, or Firm*—Foley & Lardner

[57] ABSTRACT

In an optical device comprising a substrate and a package for receiving the substrate on a bottom surface of the package, a block is fixed to an upper surface of the substrate by a low melting-point glass or a solder. The block is made of a welding material and welded to a predetermined part on a wall surface of the package. The substrate has at least one photoelectric element or optical waveguide on the upper surface. An optical fiber is fixed to the package and optically coupled to the photoelectric element or the optical waveguide through a first perforation of the package. The block may be welded to the wall surface of the package made of a welding material. The substrate may have an internal surface which defines a second perforation exposing a predetermined area of the bottom surface. The block is brought into contact with the second internal surface and the predetermined area and welded to the predetermined area.

18 Claims, 2 Drawing Sheets

OPTICAL DEVICE CAPABLE OF RELIABLY FIXING A SUBSTRATE TO A PACKAGE

BACKGROUND OF THE INVENTION

This invention relates to an optical device which comprises a substrate, the package for receiving the substrate, and an optical fiber fixed to the package.

A conventional optical device is disclosed by Yasuhisa Tanisawa et al in a U.S. patent application Ser. No. 881,187 filed on May 11, 1992 and assigned to the instant assignee. In the manner which will later be described more in detail, the conventional optical device comprises a substrate, a package, and an optical fiber. The package has a bottom surface and a wall surface which define in cooperation an installation space for receiving the substrate with the substrate brought into contact with the bottom surface. The substrate is attached to the bottom surface by a resin binder. The package has a first internal surface which defines a first perforation.

A plurality of photoelectric elements are formed on the substrate. A plurality of optical elements, such as a lens and an optical filter, are mounted on the substrate. The optical fiber is coupled to the optical elements and the photoelectric elements through the first perforation of the package.

Inasmuch as a thermal expansion coefficient of the resin binder is large, a position of the substrate displaces in response to a change of temperature. As a result, positions of the photoelectric elements and the optical elements change in response to the change of temperature.

Inasmuch as a time of cure of the resin binder is several tens of minutes to several hours, it is impossible to quickly manufacture the conventional optical device.

Inasmuch as a gas is produced from the resin binder, the gas tarnishes the photoelectric elements and the optical elements.

SUMMARY OF THE INVENTION

It is therefore an object of this invention to provide an optical device capable of reliably fixing a substrate to a package.

It is another object of this invention to provide an optical device which can be quickly manufactured.

It is still another object of this invention to provide an optical device in which a gas is not produced.

Other objects of this invention will become clear as the description proceeds.

According to an aspect of this invention, there is provided an optical device which comprises (A) a substrate having an upper surface on which at least one photoelectric element is formed; (B) a package having a bottom surface and a wall surface which define an installation space for receiving the substrate with the substrate brought into contact with the bottom surface, the package having a predetermined part on the wall surface and an internal surface which defines a perforation; (C) an optical fiber fixed to the package and optically coupled to the photoelectric element through the perforation; and (D) a block fixed to the upper surface by a low melting-point glass, the block being made of a welding material and welded to the predetermined part.

According to another aspect of this invention, there is provided an optical device which comprises (A) a substrate having an upper surface on which at least one photoelectric element is formed; (B) a package having a bottom surface and a wall surface which define an installation space for receiving the substrate with the substrate brought into contact with the bottom surface, the package being made of a welding material and having an internal surface which defines a perforation; (C) an optical fiber fixed to the package and optically coupled to the photoelectric element through the perforation; and (D) a block fixed to the upper surface by a low melting-point glass, the block being made of a welding material and welded to the wall surface.

According to still another aspect of this invention, there is provided an optical device which comprises (A) a substrate having an upper surface on which at least one photoelectric element is formed; (B) a package having a bottom surface and a wall surface which define an installation space for receiving the substrate with the substrate brought into contact with the bottom surface, the package having a predetermined part on the wall surface and an internal surface which defines a perforation; (C) an optical fiber fixed to the package and optically coupled to the photoelectric element through the perforation; and (D) a block soldered to the upper surface, the block being made of a welding material and welded to the predetermined part.

According to yet another aspect of this invention, there is provided an optical device which comprises (A) a substrate having an upper surface on which at least one photoelectric element is formed; (B) a package having a bottom surface and a wall surface which define an installation space for receiving said substrate with the substrate brought into contact with the bottom surface, the package being made of a welding material and having an internal surface which defines a perforation; (C) an optical fiber fixed to the package and optically coupled to the photoelectric element through the perforation; and (D) a block soldered to the upper surface, the block being made of a welding material and welded to the wall surface.

According to a different aspect of this invention, there is provided an optical device which comprises (A) a substrate having an upper surface on which at least one optical waveguide is formed; (B) a package having a bottom surface and a wall surface which define an installation space for receiving the substrate with the substrate brought into contact with the bottom surface, the package having a predetermined part on the wall surface and an internal surface which defines a perforation; (C) an optical fiber fixed to the package and optically coupled with the optical waveguide through the perforation; and (D) a block fixed to the upper surface by a low melting-point glass, the block made of a welding material and welded to the predetermined part.

According to another different aspect of this invention, there is an optical device which comprises (A) a substrate having an upper surface on which at least one optical waveguide is formed; (B) a package having a bottom surface and a wall surface which define an installation space for receiving the substrate with the substrate brought into contact with the bottom surface, the package being made of a welding material and having an internal surface which defines a perforation; (C) an optical fiber fixed to the package and optically coupled to the optical waveguide through the perforation; and (D) a block fixed to the upper surface by a low melting-point glass, the block being made of a welding material and welded to the wall surface.

According to still another different aspect of this invention, there is provided an optical device which comprises (A) a substrate having an upper surface on which at least one optical waveguide is formed; (B) a package having bottom and wall surfaces which define an installation space for receiving the substrate with the substrate brought into contact with the bottom surface, the package having a predetermined part on the wall surface and an internal surface which defines a perforation; (C) an optical fiber fixed to the package and optically coupled to the optical waveguide through the perforation; and (D) a block soldered to the upper surface, the block being made of a welding material and welded to the predetermined part.

According to yet another different aspect of this invention, there is provided an optical device which comprises (A) a substrate having an upper surface on which at least one optical waveguide is formed; (B) a package having a bottom surface and a wall surface which define an installation space for receiving the substrate with the substrate brought into contact with the bottom surface, the package being made of a welding material and having an internal surface which defines a perforation; (C) an optical fiber fixed to the package and optically coupled to the optical waveguide through the perforation; and (D) a block soldered to the upper surface, the block being made of a welding material and welded to the wall surface.

According to a further different aspect of this invention, there is provided an optical device which comprises (A) a substrate having an upper surface on which at least one photoelectric element is formed, the substrate having a first internal surface which defines a first perforation; (B) a package having a bottom surface and a wall surface which define an installation space for receiving the substrate with the substrate brought into contact with the bottom surface, the bottom surface having a predetermined area exposed by the first perforation, the package being made of a welding material and having a second internal surface which defines a second perforation; (C) an optical fiber fixed to the package and optically coupled to the photoelectric element through the second perforation; and (D) a block brought into contact with the predetermined area and the first internal surface, the block being made of a welding material and welded to said predetermined area.

According to a yet further different aspect of this invention, there is provided an optical device which comprises (A) a substrate having an upper surface on which at least one optical waveguide is formed, the substrate having a first internal surface which defines a first perforation; (B) a package having a bottom surface and a wall surface which define an installation space for receiving the substrate with the substrate brought into contact with the bottom surface, the bottom surface having a predetermined area exposed by the first perforation, the package being made of a welding material and having a second internal surface which defines a second perforation; (C) an optical fiber fixed to the package and optically coupled with the optical waveguide through the second perforation; and (D) a block brought into contact with the predetermined area and the first internal surface, the block being made of a welding material and welded to the predetermined area.

DESCRIPTION OF THE PREFERRED EMBODIMENTS

Figure 1:
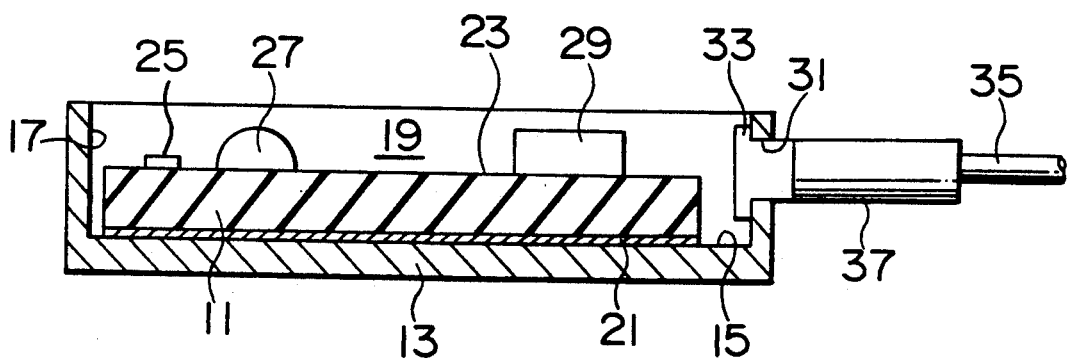
FIG. 1 is a schematic sectional view of a conventional optical device.

Referring to FIG. 1, a conventional optical device will first be described for a better understanding of this invention. The conventional optical device comprises an insulator substrate 11 and a package 13. The substrate 11 is made of silicon. The package 13 is made of a welding material and has a bottom surface 15 and a wall surface 17 which in cooperation define an installation space 19 for receiving the substrate 11 with the substrate 11 brought into contact with the bottom surface 15. The substrate 11 is attached to the bottom surface 15 by a resin binder 21.

The substrate 11 has an upper surface 23. A first metal film (not shown) is formed on the upper surface 23. A laser diode 25 is soldered onto the first metal film. A first spherical lens 27 and a prism 29 are mounted on the upper surface 23. The package 13 has a first internal surface 31 which defines a first perforation. A first Kovar block 33 is located in the first perforation. The first Kovar block 33 is welded to the first internal surface 31 by a laser beam of a YAG laser (not shown).

An optical fiber 35 has an end welded to a first outside surface of the first Kovar block 33 by the laser beam of the YAG laser. A first pipe holder 37 is fixed to the first outside surface of the first Kovar block 33 and holds the first optical fiber 35. The first optical fiber 35 is optically coupled to the laser diode 25, the first spherical lens 27, and the prism 29 through the Kovar block 33.

Inasmuch as a thermal expansion coefficient of the resin binder 21 is large, the position of the substrate 11 displaces in response to a change of temperature. As a result, positions of the laser diode 25, the first spherical lens 27, and the prism 29 change in response to the change of temperature.

Inasmuch as a time of cure of the resin binder 21 is several tens of minutes to several hours, it is impossible to quickly manufacture the conventional optical device.

Inasmuch as a gas is produced from the resin binder 21, the gas tarnishes the laser diode 25, the spherical lens 27, the prism 29, and the first Kovar block 33.

Figure 2:
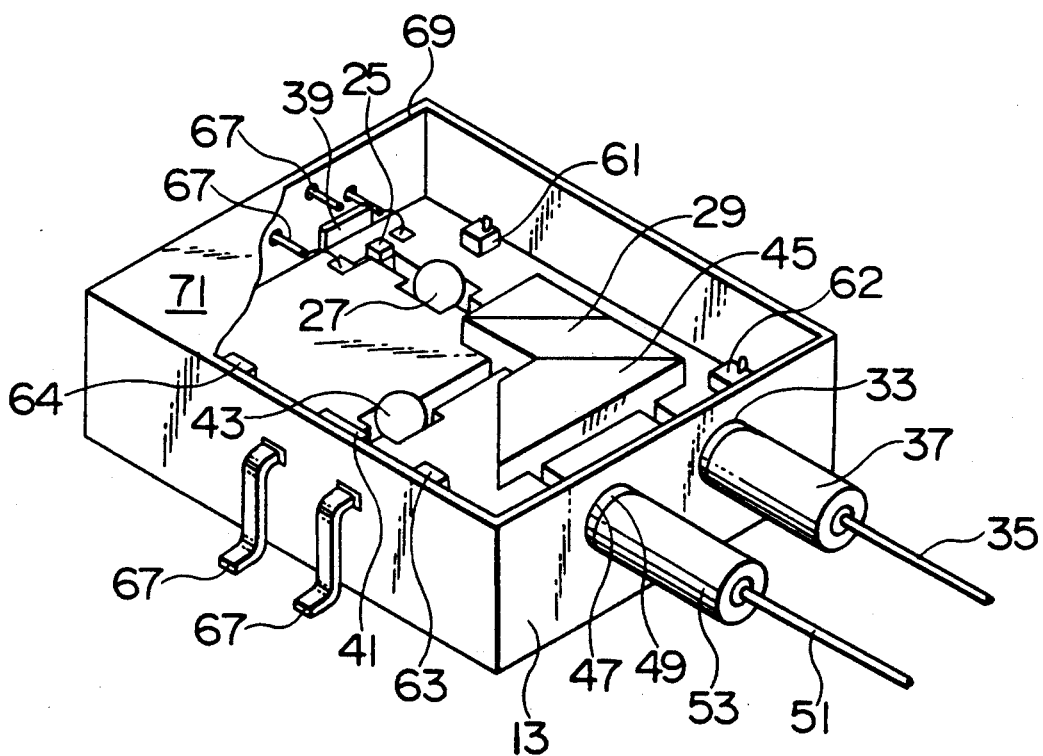
FIG. 2 is a schematic perspective view of an optical device according to a first embodiment of this invention.

Referring to FIG. 2, the description will proceed to an optical device according to a first embodiment of this invention. Similar parts are designated by like reference numerals.

A first photodiode 39 is soldered onto the first metal film formed on the substrate 11. A second metal film (not shown) is formed on the upper surface 23. A second photodiode 41 is soldered onto the second metal film. A second spherical lens 43 and an optical filter 45 are mounted on the upper surface 23.

The package 13 has a second internal surface 47 which defines a second perforation. A second Kovar block 49 is located in the second perforation. The second Kovar block 49 is welded to the second internal surface 47 by the laser beam of the YAG laser.

A second optical fiber 51 has an end welded to a second outside surface of the second Kovar block 49 by the laser beam of the YAG laser. A second pipe holder 53 is fixed to the second outside surface of the second Kovar block 49 and holds the second optical fiber 51. The first optical fiber 35 is optically coupled to the first photodiode 39, the laser diode 25, the first spherical lens 27, the prism 29, and the optical filter 45. The second optical fiber 51 is optically coupled to the second photodiode 41, the second spherical lens 43, the prism 29, and the optical filter 45.

In the optical device being illustrated, the substrate 11 is not attached to the bottom surface 15 by the resin binder 21. The upper surface 23 has first through fourth recessed surfaces which define first through fourth indents, respectively. First through fourth blocks 61, 62, 63, and 64 are fixed to the first through the fourth recessed surfaces by first through fourth low melting-point glass pieces. Each of the first through the fourth blocks 61, 62, 63, and 64 is adjacent to the wall surface 17. Each of the first through the fourth blocks 61, 62, 63, and 64 is made of a welding material and is welded to the wall surface 17 by the laser beam of the YAG laser.

The package 13 has a plurality of connectors 67. The laser diode 25 and the first and the second photodiodes 39 and 41 are connected to connectors 67 by wire bonding. The package 13 has a wall edge 69. An upper cover 71 is fixed on the wall edge 69.

Figure 3:
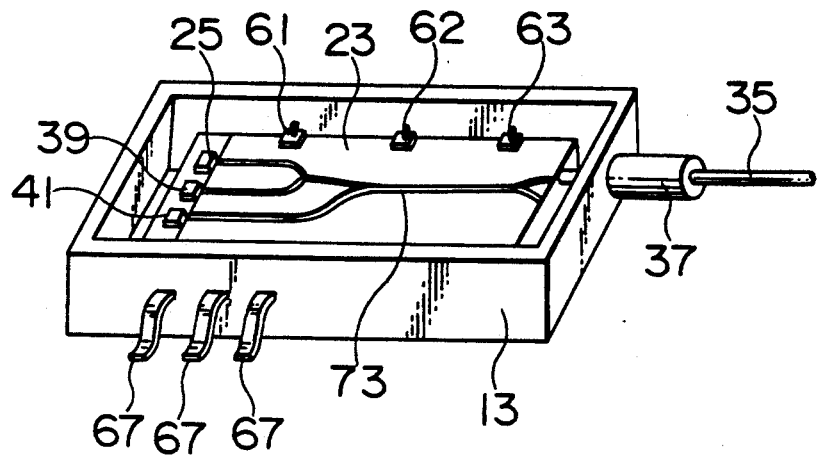
FIG. 3 is a schematic perspective view of an optical device according to a second embodiment of this invention.

Referring to FIG. 3, the description will proceed to an optical device according to a second embodiment of this invention. Similar parts are designated by like reference numerals.

An optical waveguide 73 is formed on the upper surface 23. The optical waveguide 73 branches or fans out into three narrow or small waveguides and has first through fourth ends. The first optical fiber 35, the laser diode 25, and the first and the second photodiodes 39 and 41 are connected to the first through the fourth ends of the optical waveguide 73.

In FIGS. 2 and 3, the package 13 may have first through fourth predetermined parts on the wall surface 17. Each of the first through the fourth predetermined parts is made of a welding material. The first through the fourth blocks 61 to 64 are welded to the first through the fourth predetermined parts. The first through the fourth blocks 61 to 64 may be soldered to the first through the fourth recessed surfaces.

Figure 4:
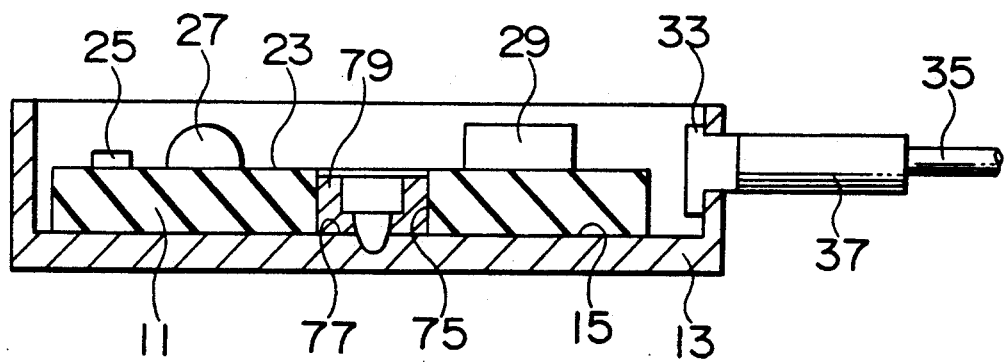
FIG. 4 is a schematic sectional view of an optical device according to a third embodiment of this invention.

Referring to FIG. 4, the description will proceed to an optical device according to a third embodiment of this invention. Similar parts are designated by like reference numerals.

The substrate 11 has a third internal surface 75 which defines a third perforation. The bottom surface 15 has a predetermined area 77 exposed to the installation space 19 through the third perforation. A fifth block 79 is brought into contact with the predetermined area 77 and the third internal surface 75. The fifth block 79 is made of the welding material and welded to the predetermined area 77 by the laser beam of the YAG laser.

What is claimed is:

1. An optical device comprising:
   a substrate having an upper surface on which at least one photoelectric element is formed;
   a package having a bottom surface and a wall surface which define an installation space for receiving said substrate with the substrate brought into contact with said bottom surface, said package having a predetermined part on said wall surface and an internal surface which defines a perforation;
   an optical fiber fixed to said package and optically coupled to said photoelectric element through said perforation; and
   a block fixed to said upper surface by a low melting-point glass, said block being made of a welding material and welded to said predetermined part.

2. An optical device as claimed in claim 1, wherein said upper surface has a recessed surface which defines an indent for receiving said block, said block being fixed to said recessed surface by said low melting-point glass.

3. An optical device comprising:
   a substrate having an upper surface on which at least one photoelectric element is formed;
   a package having a bottom surface and a wall surface which define an installation space for receiving said substrate with the substrate brought into contact with said bottom surface, said package being made of a welding material and having an internal surface which defines a perforation;
   an optical fiber fixed to said package and optically coupled to said photoelectric element through said perforation; and
   a block fixed to said upper surface by a low melting-point glass, said block being made of a welding material and welded to said wall surface.

4. An optical device as claimed in claim 3, wherein said upper surface has a recessed surface which defines an indent for receiving said block, said block being fixed to said recessed surface by said low melting-point glass.

5. An optical device, comprising:
   a substrate having an upper surface on which at least one photoelectric element is formed;
   a package having a bottom surface and a wall surface which define an installation space for receiving said substrate with said substrate brought into contact with said bottom surface, said package having a predetermined part on said wall surface and an internal surface which defines a perforation;
   an optical fiber fixed to said package and optically coupled to said photoelectric element through said perforation; and
   a block soldered to said upper surface, said block being made of a welding material and welded to said predetermined part for securing said substrate to said package.

6. An optical device, comprising:
   a substrate having an upper surface on which at least one photoelectric element is formed;
   a package having a bottom surface and a wall surface which define an installation space for receiving said substrate with said substrate brought into contact with said bottom surface, said package having a predetermined part on said wall surface and an internal surface which defines a perforation;
   an optical fiber fixed to said package and optically coupled to said photoelectric element through said perforation; and
   a block soldered to said upper surface, said block being made of a welding material and welded to said predetermined part, said upper surface having a recessed surface which defines an indent for receiving said block, said block being soldered to said recessed surface.

7. An optical device, comprising:
a substrate having an upper surface on which at least one photoelectric element is formed;
a package having a bottom surface and a wall surface which define an installation space for receiving said substrate with said substrate brought into contact with said bottom surface, said package being made of welding material and having an internal surface which defines a perforation;
an optical fiber fixed to said package and optically coupled to said photoelectric element through said perforation and
a block soldered to said upper surface, said block being made of a welding material and welded to said wall surface for securing said substrate to said package.

8. An optical device, comprising:
a substrate having an upper surface on which at least one photoelectric element is formed;
a package having a bottom surface and a wall surface which define an installation space for receiving said substrate with said substrate brought into contact with said bottom surface, said package being made of a welding material and having an internal surface which defines a perforation;
an optical fiber fixed to said package and optically coupled to said photoelectric element through said perforation; and
a block soldered to said upper surface, said block being made of a welding material and welded to said wall surface, said upper surface having a recessed surface which defines an indent for receiving said block, said block being soldered to said recessed surface.

9. An optical device comprising:
a substrate having an upper surface on which at least one optical waveguide is formed;
a package having a bottom surface and a wall surface which define an installation space for receiving said substrate with the substrate brought into contact with said bottom surface, said package having a predetermined part on said wall surface and an internal surface which defines a perforation;
an optical fiber fixed to said package and optically coupled with said optical waveguide through said perforation; and
a block fixed to said upper surface by a low melting-point glass, said block made of a welding material and welded to said predetermined part.

10. An optical device as claimed in claim 9, wherein said upper surface has a recessed surface which defines an indent for receiving said block, said block being fixed to said recessed surface by said low melting-point glass.

11. An optical device comprising:
a substrate having an upper surface on which at least one optical waveguide is formed;
a package having a bottom surface and a wall surface which define an installation space for receiving said substrate with the substrate brought into contact with said bottom surface, said package being made of a welding material and having an internal surface which defines a perforation;
an optical fiber fixed to said package and optically coupled to said optical waveguide through said perforation; and
a block fixed to said upper surface by a low melting-point glass, said block being made of a welding material and welded to said wall surface.

12. An optical device as claimed in claim 11, wherein said upper surface has a recessed surface which defines an indent for receiving said block, said block being fixed to said recessed surface by a low melting-point glass.

13. An optical device, comprising:
a substrate having an upper surface on which at least one optical waveguide is formed
a package having bottom and wall surfaces which define an installation space for receiving said substrate with said substrate brought into contact with said bottom surface, said package having a predetermined part on said wall surface and an internal surface which defines a perforation;
an optical fiber fixed to said package and optically coupled to said optical waveguide through said perforation; and
a block soldered to said upper surface, said block being made of a welding material and welded to said predetermined part for securing said substrate to said package.

14. An optical device, comprising:
a substrate having an upper surface on which at least one optical waveguide is formed;
a package having bottom and wall surfaces which define an installation space for receiving said substrate with said substrate brought into contact with said bottom surface, said package having a predetermined part on said wall surface and an internal surface which defines a perforation;
an optical fiber fixed to said package and optically coupled to said optical waveguide through said perforation; and
a block soldered to said upper surface, said block being made of a welding material and welded to said predetermined part, said upper surface having a recessed surface which defines an indent for receiving said block, said block being soldered to said recessed surface.

15. An optical device, comprising:
a substrate having an upper surface on which at least one optical waveguide is formed;
a package having a bottom surface and a wall surface which define an installation space for receiving said substrate with the substrate brought into contact with said bottom surface, said package being made of a welding material and having an internal surface which defines a perforation;
an optical fiber fixed to said package and optically coupled to said optical waveguide through said perforation; and
a block soldered to said upper surface, said block being made of a welding material and welded to said wall surface for securing said substrate to said package.

16. An optical device, comprising:
a substrate having an upper surface on which at least one optical waveguide is formed;
a package having a bottom surface and a wall surface which define an installation space for receiving said substrate with the substrate brought into contact with said bottom surface, said package being made of a welding material and having an internal surface which defines a perforation;

an optical fiber fixed to said package and optically coupled to said optical waveguide through said perforation; and a block soldered to said upper surface, said block being made of a welding material and welded to said wall surface, said upper surface having a recessed surface which defines an indent for receiving said block, said block being soldered to said recessed surface.

17. An optical device comprising:

a substrate having an upper surface on which at least one photoelectric element is formed, said substrate having a first internal surface which defines a first perforation;

a package having a bottom surface and a wall surface which define an installation space for receiving said substrate with the substrate brought into contact with said bottom surface, said bottom surface having a predetermined area exposed by said first perforation, said package being made of a welding material and having a second internal surface which defines a second perforation;

an optical fiber fixed to said package and optically coupled to said photoelectric element through said second perforation; and a block brought into contact with said predetermined area and said first internal surface, said block being made of a welding material and welded to said predetermined area.

18. An optical device comprising:

a substrate having an upper surface on which at least one optical waveguide is formed, said substrate having a first internal surface which defines a first perforation;

a package having a bottom surface and a wall surface which define an installation space for receiving said substrate with the substrate brought into contact with said bottom surface, said bottom surface having a predetermined area exposed by said first perforation, said package being made of a welding material and having a second internal surface which defines a second perforation an optical fiber fixed to said package and optically coupled with said optical waveguide through said second perforation; and a block brought into contact with said predetermined area and said first internal surface, said block being made of a welding material and welded to said predetermined area.

* * * * *